US012246707B2

(12) United States Patent
Fujita et al.

(10) Patent No.: US 12,246,707 B2
(45) Date of Patent: Mar. 11, 2025

(54) CONTROL DEVICE FOR COLLISION AVOIDANCE ASSISTANCE, AND COLLISION AVOIDANCE ASSISTANCE METHOD

(71) Applicant: TOYOTA JIDOSHA KABUSHIKI KAISHA, Toyota Aichi-ken (JP)

(72) Inventors: Kazuyuki Fujita, Gotemba Shizuoka-ken (JP); Minami Sato, Ebina Kanagawa-ken (JP); Taira Nagashima, Sunto-gun Shizuoka-ken (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 349 days.

(21) Appl. No.: 17/870,999

(22) Filed: Jul. 22, 2022

(65) Prior Publication Data

US 2023/0030310 A1    Feb. 2, 2023

(30) Foreign Application Priority Data

Jul. 29, 2021    (JP) .................................. 2021-124787

(51) Int. Cl.
*B60W 30/095*    (2012.01)
*B60W 40/04*     (2006.01)
*B60W 40/105*    (2012.01)

(52) U.S. Cl.
CPC ........ *B60W 30/0956* (2013.01); *B60W 40/04* (2013.01); *B60W 40/105* (2013.01); *B60W 2520/12* (2013.01)

(58) Field of Classification Search
CPC ............. B60W 30/0956; B60W 40/04; B60W 40/105; B60W 2520/12; B60W 2554/801;
(Continued)

(56) References Cited

U.S. PATENT DOCUMENTS 8,576,055 B2 *  11/2013  Hara ...................... G08G 1/166
340/436
2015/0298621 A1  10/2015  Katoh
(Continued)

FOREIGN PATENT DOCUMENTS

JP    2018-012360 A      1/2018
JP    2018063605 A  *   4/2018
(Continued)

*Primary Examiner* — Kito R Robinson
*Assistant Examiner* — Rose Ridder
(74) *Attorney, Agent, or Firm* — Dinsmore & Shohl LLP

(57) ABSTRACT

A control device for collision avoidance assistance includes a processor. The processor is configured to execute region setting processing for setting an assistance determination region indicating a particular region forward of a vehicle, and to execute accumulation processing in which the processor gives an object a determination value and accumulates the determination value. The object is located in the assistance determination region. The determination value is decided according to the position of the object. The processor is configured to perform collision avoidance assistance control of assisting in avoidance of collision of the vehicle and the object based on driving environment information indicating a driving environment of the vehicle, when a cumulative value regarding the object calculated in the accumulation processing exceeds a predetermined threshold value.

8 Claims, 12 Drawing Sheets

(58) Field of Classification Search
CPC ..... B60W 2554/802; B60W 2554/803; B60W 2554/804; B60W 10/18; B60W 30/08; B60W 30/09; B60W 30/095; B60W 30/0953; B60W 10/20
See application file for complete search history.

(56) References Cited

U.S. PATENT DOCUMENTS

| | | |
|---|---|---|
| 2016/0016561 A1* | 1/2016 | Lee ..................... G01S 13/867 701/70 |
| 2018/0022328 A1 | 1/2018 | Tochigi et al. |
| 2021/0053561 A1* | 2/2021 | Beller .................... G08G 1/166 |
| 2021/0150897 A1* | 5/2021 | Jonsson .......... B60W 30/18018 |
| 2023/0286536 A1* | 9/2023 | Belman .............. G01C 21/3415 |

FOREIGN PATENT DOCUMENTS

| | | | |
|---|---|---|---|
| WO | 2014/024336 A1 | 2/2014 | |
| WO | WO-2019089591 A1 * | 5/2019 | ............ B60W 30/09 |

* cited by examiner

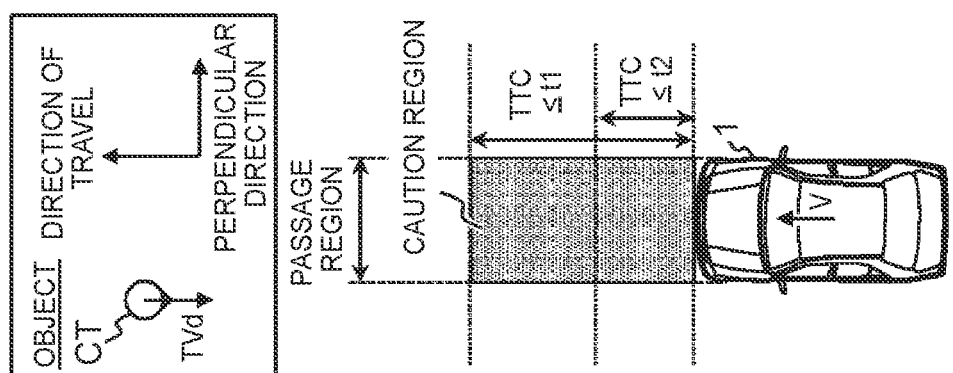
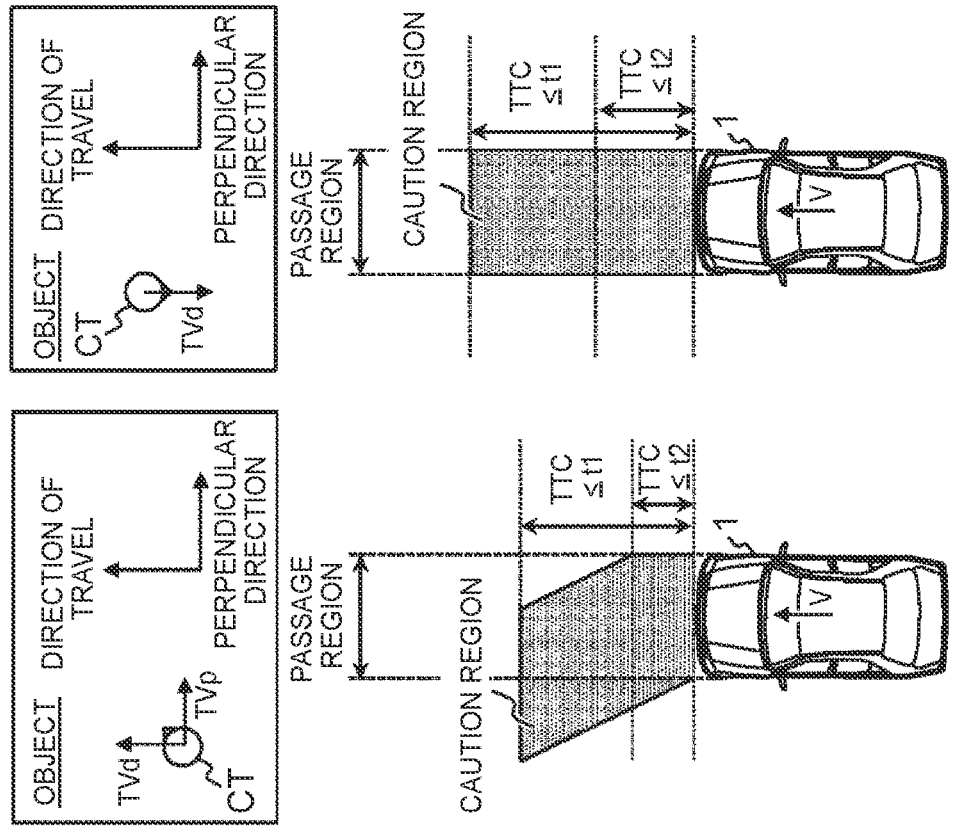
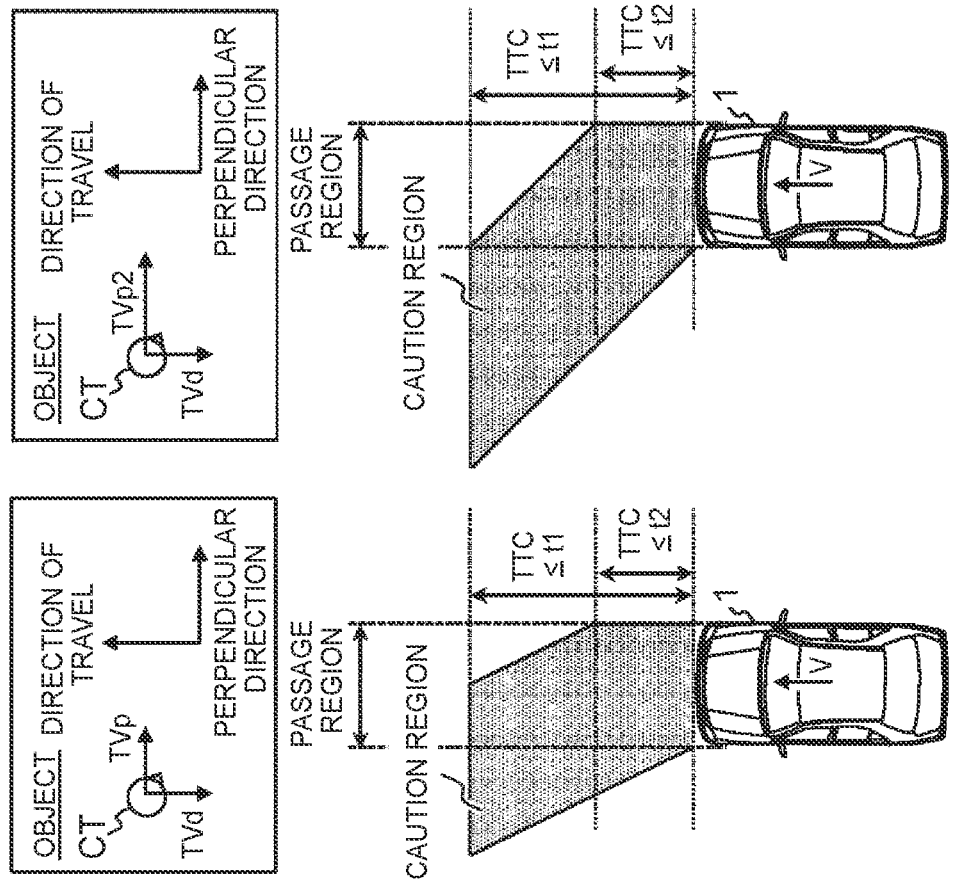

FIG. 12
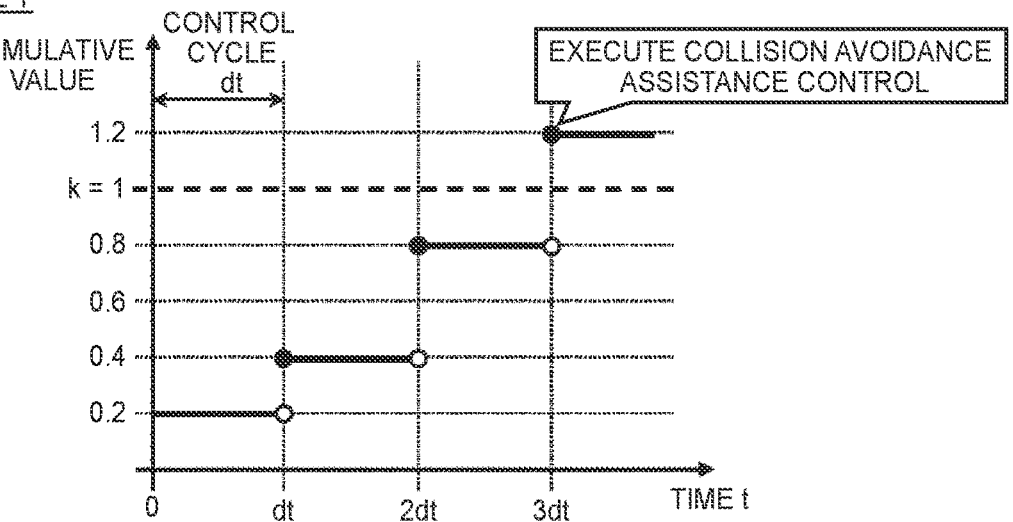
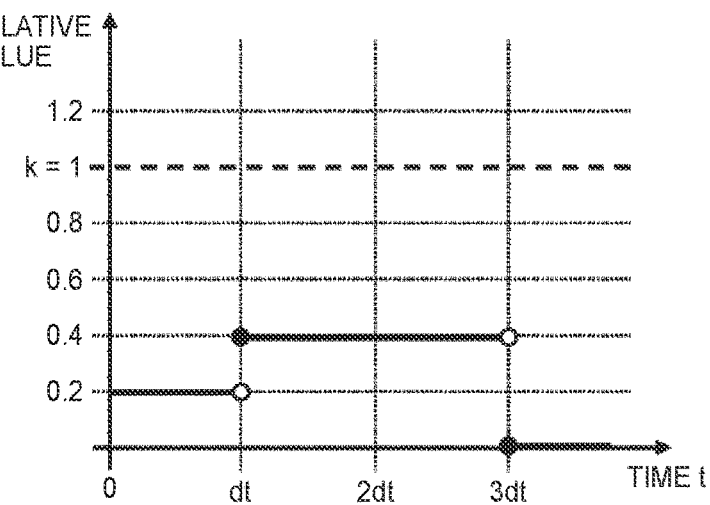
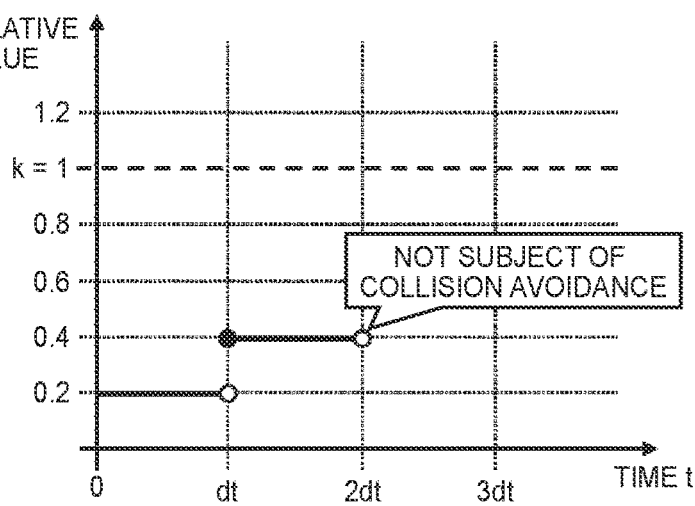

CONTROL DEVICE FOR COLLISION AVOIDANCE ASSISTANCE, AND COLLISION AVOIDANCE ASSISTANCE METHOD

CROSS-REFERENCE TO RELATED APPLICATION

This application claims priority to Japanese Patent Application No. 2021-124787 filed on Jul. 29, 2021, incorporated herein by reference in its entirety.

BACKGROUND

1. Technical Field

The disclosure relates to a control device for assisting avoidance of a collision between a vehicle and an object, and a collision avoidance assistance method.

2. Description of Related Art

Japanese Unexamined Patent Application Publication No. 2018-012360 (JP 2018-012360 A) discloses a driver assistance device that assists in avoiding collision between a vehicle and an object, taking into consideration a position of the object located on a roadway or a sidewalk.

This driver assistance device starts assistance when an object is predicted to enter a region set in the perimeter of the vehicle, within a predetermined amount of time. In addition, this driver assistance device determines in which of a first roadway region (a region in a lane in which the vehicle is travelling), a second roadway region (a region in a lane other than the first roadway region), and a sidewalk region, the object is located. The driver assistance device is configured such that, when the object is in the first roadway region, assistance is started more readily than when the object is in the second roadway region. The driver assistance device is also configured such that, when the object is in the second roadway region, assistance is started more readily than when the object is in the sidewalk region.

SUMMARY

In order to predict whether an object enters a certain region within a predetermined amount of time, there is a need to predict and give the velocity of movement of the object. The velocity of movement of the object in this case is given by being predicted from a value measured by a sensor, being set in advance in a control device (e.g., set to 5 kilometers per hour (kph), which is a standard walking speed, when the object is a pedestrian), or the like.

However, the velocity of movement of objects differs depending on individual states and environments, and accordingly accurately predicting and giving the velocity of movement of the objects is difficult.

Thus, when control of assisting in collision avoidance (collision avoidance assistance control) is executed under a condition that an object enters within a certain range, the collision avoidance assistance control may be executed when no collision avoidance assistance is required. This leads to annoyance of passengers and occupants of the vehicle.

The disclosure provides a control device for collision avoidance assistance with regard to a vehicle configured to suppress unnecessary operation of collision avoidance assistance control, and a collision avoidance assistance method.

A first aspect of the present disclosure is a control device. The control device includes a processor configured to perform collision avoidance assistance control. The processor is configured to execute region setting processing for setting an assistance determination region indicating a particular region forward of a vehicle, is configured to execute accumulation processing in which the processor gives an object a determination value and accumulates the determination value. The object is located in the assistance determination region. The determination value is decided according to a position of the object. The processor is configured to perform collision avoidance assistance control of assisting in avoidance of collision of the vehicle and the object based on driving environment information representing a driving environment of the vehicle, when a cumulative value calculated in the accumulation processing exceeds a predetermined threshold value.

In the first aspect, the processor may be configured to, in the region setting processing, set a plurality of assumed lateral velocities, the assumed lateral velocities being assumed values of a velocity of the object in a direction perpendicular to a direction of travel of the vehicle, and set a caution region for each of the set assumed lateral velocities. The caution region may be a region in which the object is located in a passage region of the vehicle with a collision leeway time of no more than a predetermined value. The assistance determination region may be a combined region of each of the caution regions. In the accumulation processing, the determination value may be a value decided for each region sectioned by boundary lines of each of the caution regions.

In the first aspect, the processor may be configured to acquire information regarding a type of the object, and may be configured to set, in the region setting processing, each of the assumed lateral velocities based on the type of the object.

A second aspect of the present disclosure is a collision avoidance assistance method. The collision avoidance assistance method is a method of assisting avoidance of collision of a vehicle and an object and has region setting processing for setting an assistance determination region indicating a particular region forward of a vehicle, accumulation processing in which an object located in the assistance determination region is given a determination value decided according to a position of the object, and the determination value is accumulated, and performing assistance for avoidance of collision with the object, when a cumulative value regarding the object calculated in the accumulation processing exceeds a predetermined threshold value.

In the second aspect, the region setting processing may include setting a plurality of assumed lateral velocities, the assumed lateral velocities being assumed values of a velocity of the object in a direction perpendicular to a direction of travel of the vehicle, and setting a caution region for each of the set assumed lateral velocities. The caution region may be a region in which the object is located in a passage region of the vehicle with a collision leeway time of no more than a predetermined value. The assistance determination region may be a combined region of each of the caution regions. In the accumulation processing, the determination value may be a value decided for each region sectioned by boundary lines of each of the caution regions.

In the second aspect, each of the assumed lateral velocities may be set based on a type of the object in the region setting processing.

According to the first aspect and the second aspect of the present disclosure, an object located in an assistance determination region is taken as a subject of assistance for collision avoidance, a determination value is given in accordance with the position of the object and the determination value is accumulated. When a cumulative value thereof exceeds a predetermined threshold value, collision avoidance assistance regarding the object is performed. In this way, operation of collision avoidance assistance control can be suppressed when the velocity of movement of the object is great or small in comparison to the predicted velocity, and collision avoidance assistance is unnecessary. Thus, annoyance of the passengers and occupants of the vehicle can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3A is a conceptual diagram for describing a caution region that changes in accordance with the longitudinal velocity and the lateral velocity of the object that is the subject of collision avoidance;

FIG. 3B is a conceptual diagram for describing a caution region that changes in accordance with the longitudinal velocity and the lateral velocity of the object that is the subject of collision avoidance;

FIG. 3C is a conceptual diagram for describing a caution region that changes in accordance with the longitudinal velocity and the lateral velocity of the object that is the subject of collision avoidance;

FIG. 3D is a conceptual diagram for describing a caution region that changes in accordance with the longitudinal velocity and the lateral velocity of the object that is the subject of collision avoidance;

FIG. 12 is graphs showing cumulative values in each of movement routes illustrated in FIG. 11.

DETAILED DESCRIPTION OF EMBODIMENTS

An embodiment of the disclosure will be described below with reference to the drawings. It should be noted though, that when a number, such as a count, a quantity, an amount, a range, or the like, of each element, is stated in the following embodiment, the technical idea of the disclosure is not limited to the stated number unless otherwise specified in particular, or when obviously limited to the stated number in principle. Also, configurations and the like described in the following embodiments are not necessarily essential to the technical idea of the disclosure, unless otherwise specified in particular or when obviously limited thereto in principle. Note that in each of the drawings, same or equivalent parts are denoted by the same signs, and repetitive description thereof is to be simplified or omitted as appropriate.

1. Overview

A control device according to an embodiment performs collision avoidance assistance control of assisting in collision avoidance between a vehicle and an object. Examples of objects that are a subject of collision avoidance include pedestrians, bicycles, parked vehicles, obstructions, and so forth. The control device according to the present embodiment is typically an electronic control unit (ECU) installed in a vehicle. Note however, that the control device may be an external device not onboard the vehicle, and control the vehicle remotely. Also, the form of the vehicle in which the control device according to the present embodiment is installed is not limited in particular.

Figure 1A:
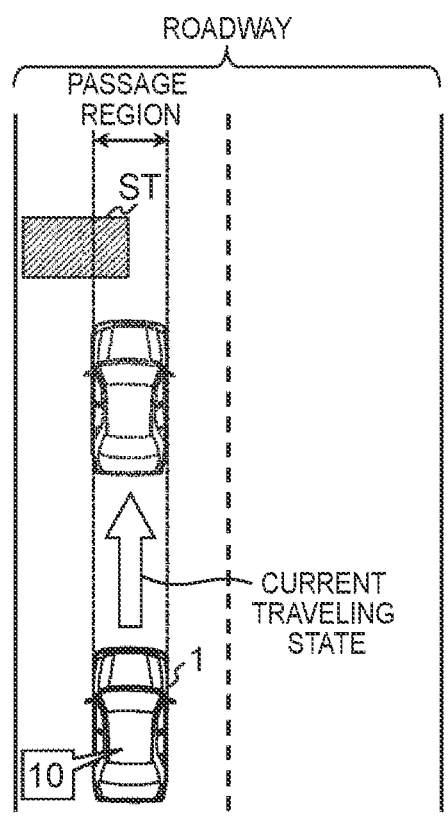
FIG. 1A is a conceptual diagram for describing collision avoidance assistance control.
Figure 1B:
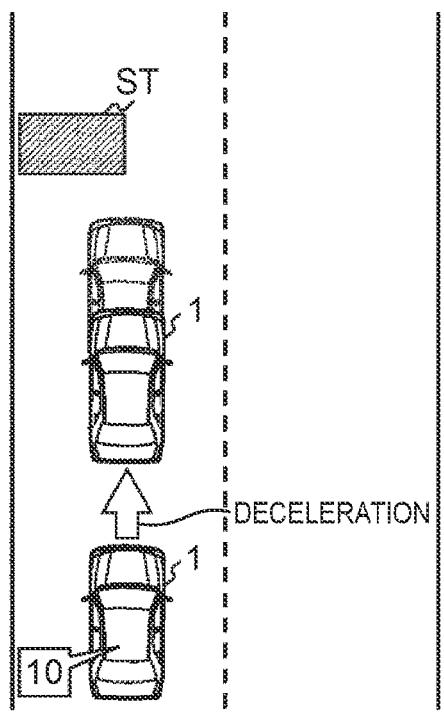
FIG. 1B is a conceptual diagram for describing collision avoidance assistance control when collision avoidance assistance is performed by braking control.
Figure 1C:
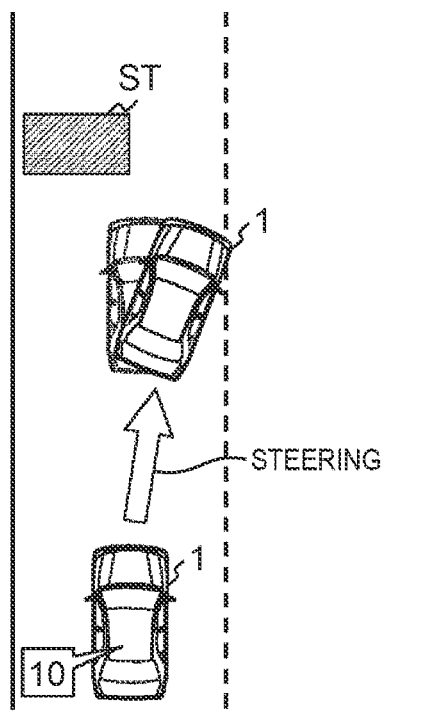
FIG. 1C is a conceptual diagram for describing collision avoidance assistance control when collision avoidance assistance is performed by steering control.

FIG. 1A is a conceptual diagram for describing collision avoidance assistance control. FIG. 1B is a conceptual diagram for describing collision avoidance assistance control when collision avoidance assistance is performed by braking control. FIG. 1C is a conceptual diagram for describing collision avoidance assistance control when collision avoidance assistance is performed by steering control. FIGS. 1A to 1C illustrate a case in which a vehicle 1 is traveling on a roadway, and collision avoidance assistance control is performed regarding a stationary object ST on the roadway as a subject. Collision avoidance assistance control is performed by a control device 100 installed in the vehicle 1.

Collision avoidance assistance control is performed when the control device 100 determines that avoiding collision with the object cannot be readily performed when the vehicle 1 maintains the current traveling state (velocity, direction of travel, etc.). Collision avoidance assistance control typically performs collision avoidance assistance by controlling braking or steering of the vehicle 1. FIG. 1B illustrates when collision avoidance is assisted by braking control, and FIG. 1C illustrates when collision avoidance is assisted by steering control.

As illustrated in FIG. 1B, the vehicle 1 decelerates by braking control, and collision avoidance can be performed with sufficient leeway. Also, as illustrated in FIG. 1C, collision avoidance can be facilitated by steering the vehicle 1 by steering control.

Conventionally, a collision leeway time (time-to-collision (TTC)) regarding an object is used in judging whether to perform collision avoidance assistance control. The TTC indicates the amount of time until the vehicle 1 and the object collide with each other, when the current relative velocity between the vehicle 1 and the object (hereinafter, also referred to simply as "relative velocity") in the direction of travel of the vehicle 1 is maintained. Accordingly, when the TTC is equal to or less than a predetermined value, determination can be made that collision avoidance cannot be readily performed.

Also, in judging whether to perform collision avoidance assistance control, the position of the object in a direction perpendicular as to the direction of travel of the vehicle 1 and the velocity of the object in the perpendicular direction should also be taken into consideration, and hereinafter, the direction perpendicular as to the direction of travel of the vehicle 1 is also referred to as "perpendicular direction", the position of the object in the perpendicular direction as "lateral position", and the velocity of the object in the perpendicular direction as "lateral velocity". This is because, depending on the lateral position and the lateral velocity of the object, a situation is conceivable in which the object is not situated in a passage region of the vehicle 1 with a TTC of a predetermined value or less, and in such a situation, collision avoidance assistance is not to be required. Examples thereof include when the lateral position of the object is sufficiently distant from the vehicle 1, and the object is moving in the direction of travel of the vehicle 1 or in a direction away from the vehicle 1, or when the lateral velocity of the object is sufficiently great and the object leaves the passage region of the vehicle 1 without the TTC becoming equal to or less than the predetermined value.

Accordingly, there conventionally has been conceived setting a caution region indicating a particular region forward of the vehicle 1, based on the velocity of the object in the direction of travel (hereinafter, also referred to as "longitudinal velocity") and the lateral velocity, and performing collision avoidance assistance control under a condition that the object is situated in this caution region.

Figure 2:
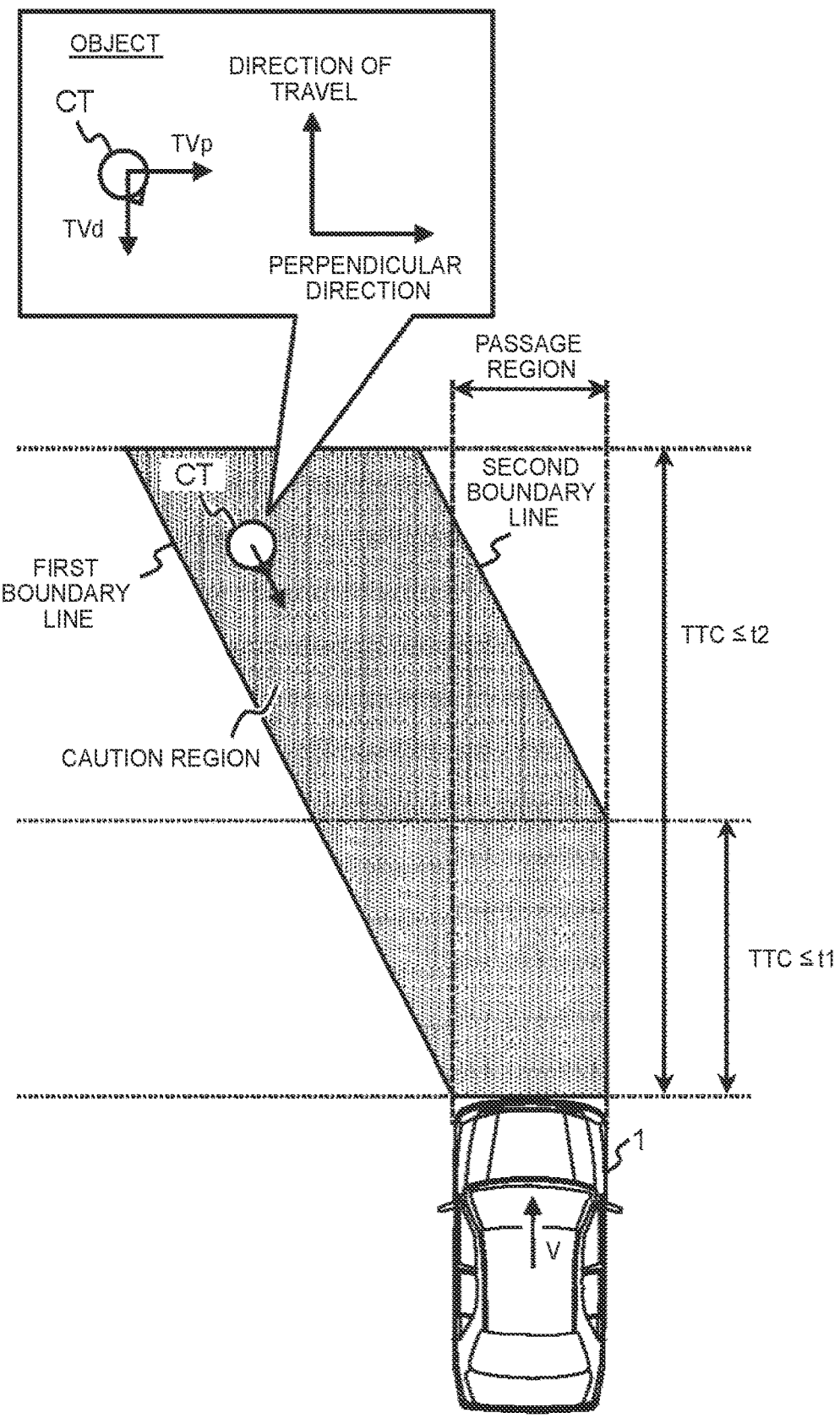
FIG. 2 is a conceptual diagram illustrating an example of a caution region, which is set based on a longitudinal velocity and a lateral velocity of an object that is a subject of collision avoidance.

FIG. 2 is a conceptual diagram illustrating an example of setting a caution region based on the longitudinal velocity and the lateral velocity of an object CT. FIG. 2 illustrates a case in which the vehicle 1 is traveling at a velocity V, and determination is made regarding whether to perform collision avoidance assistance control with respect to the object CT. Now, the object CT is located to the left side when viewed from the vehicle 1, and is moving at a longitudinal velocity TVd in a direction approaching the vehicle 1, and a lateral velocity TVp in a direction toward the right when viewed from the vehicle 1.

In FIG. 2, the distances indicated by TTC≤t1 and TTC≤t2 are distances traveled between time t1 and time t2 at a relative velocity V−TVd, respectively. Further, the magnitudes of inclination of a first boundary line and a second boundary line, which are boundary lines of the caution region, are the same as each other, and are represented by the ratio of the relative velocity V−TVd as to the lateral velocity TVp of the object CT (the direction of the object CT approaching as seen from the vehicle 1).

That is to say, the caution region illustrated in FIG. 2 is a region in which the TTC is a predetermined value t2 or less, and the object CT is to be situated in the passage region of the vehicle 1 with a TTC of a predetermined value t1 or less.

The caution region illustrated in FIG. 2 can be set by giving the relative velocity V−TVd and the lateral velocity TVp.

Note that the caution region can be set in the same way when the object CT is located on the right side when viewed from the vehicle 1, as well. At this time, the caution region has a shape inclined to the right side when viewed from the vehicle 1, in symmetry with the caution region illustrated in FIG. 2. Further, such a caution region is not set when the object CT is moving in a direction away from the vehicle 1. Examples include when the object CT is located on the left side when viewed from the vehicle 1 and is moving leftward in the perpendicular direction on the left side when viewed from the vehicle 1, and when the object CT is located on the right side when viewed from the vehicle 1 and is moving in the perpendicular direction on the right side when viewed from the vehicle 1.

In addition, limiting the caution region to the roadway region is conceivable, in order to suppress operation of collision avoidance assistance control for the objects CT outside of the roadway region. In this case, whether the object CT is located in the roadway region is determined. Further, whether the object CT is about to cross the roadway region may be determined in some cases.

Such a caution region is to change in accordance with the velocity of the object CT that is the subject. FIGS. 3A to 3D are conceptual diagrams for describing the caution region changing in accordance with the velocity of the object CT. FIGS. 3A to 3D illustrate the same case as in FIG. 2, and illustrate cases in which the longitudinal and lateral velocities of the object CT are each different. Here, the caution region illustrated in FIG. 3A is equivalent to the caution region illustrated in FIG. 2.

In FIG. 3B, the object CT is moving at the longitudinal velocity TVd in a direction approaching the vehicle 1 and at a lateral velocity TVp2 in the rightward direction when viewed from the vehicle 1. Here, the magnitude of the lateral velocity TVp2 is greater than a lateral velocity TVp of the object CT illustrated in FIG. 3A. Accordingly, the caution region has a shape that is more inclined to the left side when viewed from the vehicle 1 as compared with FIG. 3A.

In FIG. 3C, the object CT is moving at the longitudinal velocity TVd in a direction away from the vehicle 1 and at the lateral velocity TVp in the rightward direction when viewed from the vehicle 1. The relative velocity V−TVd here is smaller than that in FIG. 3A, and accordingly the caution region has a shape that is shorter in the direction of travel.

FIG. 3D illustrates a case in which the object CT is moving at the longitudinal velocity TVd in the direction approaching the vehicle 1, and has no lateral velocity. At this time, the caution region becomes a rectangular region that is a part of the passage region.

Here, regarding the magnitude of the lateral velocity TVp of the object CT given when setting the caution region there are cases in which this is given by predicting from detection values of sensors, and cases in which this is given in advance according to the type of the object CT. When given in advance in accordance with the type of the object CT, when the object CT is detected to be a pedestrian, the magnitude of the lateral velocity TVp of the object CT is given at a general walking speed of 5 kilometers per hour (kph), for example.

However, the velocities of objects CT differ depending on the individual states and environments, and it is difficult to accurately predict and give the velocity for a certain period when setting the caution region. When there is difference between the predicted velocity of the object CT and the actual velocity of the object CT, there is a risk of triggering unnecessary operation of the collision avoidance assistance control.

Figure 4:
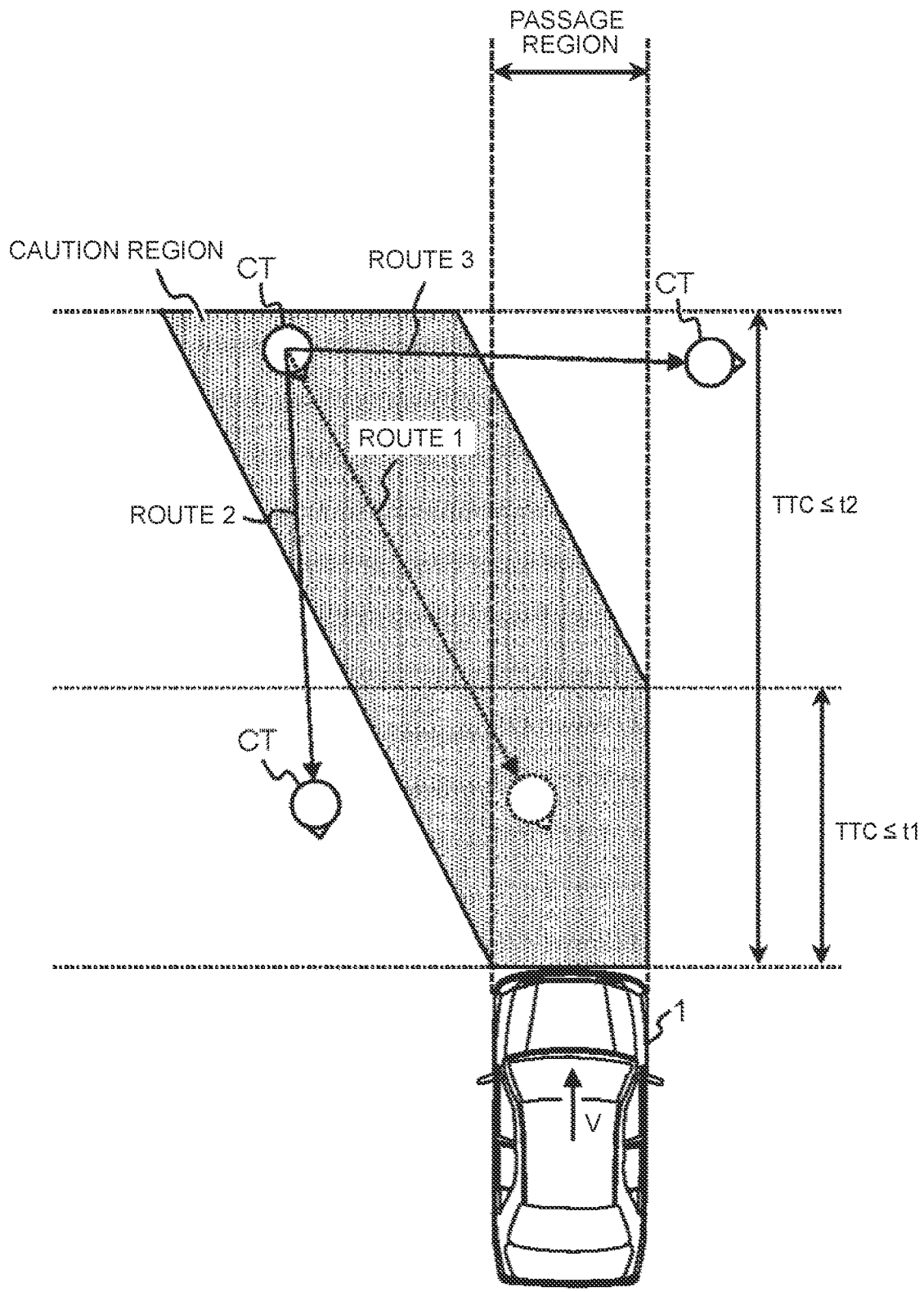
FIG. 4 is a conceptual diagram for describing unnecessary operation of collision avoidance assistance control, due to a difference between the velocity of the object given when setting the caution region and the actual velocity of the object.

FIG. 4 is a conceptual diagram for describing unnecessary operation of the collision avoidance assistance control due to difference between the predicted velocity of the object CT and the actual velocity of the object CT. In FIG. 4, the object CT is located in the caution region, and is predicted to be located in the passage region of the vehicle 1 with a TTC of a predetermined value t1 or less (route 1). However, when the actual lateral velocity of the object CT is smaller than the predicted velocity of the object CT (route 2), or the actual lateral velocity is greater (route 3), or the like, there may be cases in which the object CT is not actually to be located in the passage region of the vehicle 1 with a TTC of the predetermined value t1 or less. In such a case, assistance for collision avoidance regarding the object CT is unnecessary.

Accordingly, the control device 100 according to the present embodiment sets an assistance determination region indicating a particular region forward of the vehicle 1, and accumulates a determination value decided in accordance with the position of the object CT in the assistance determination region for each control cycle. When a cumulative value thereof exceeds a predetermined threshold value, collision avoidance assistance control is performed. Here, the assistance determination region is obtained by setting a plurality of assumed values of the lateral velocity of the object CT (hereinafter, also referred to as "assumed lateral velocity"), setting a caution region for each of the set assumed lateral velocities, and combining the set caution regions.

Figure 5:
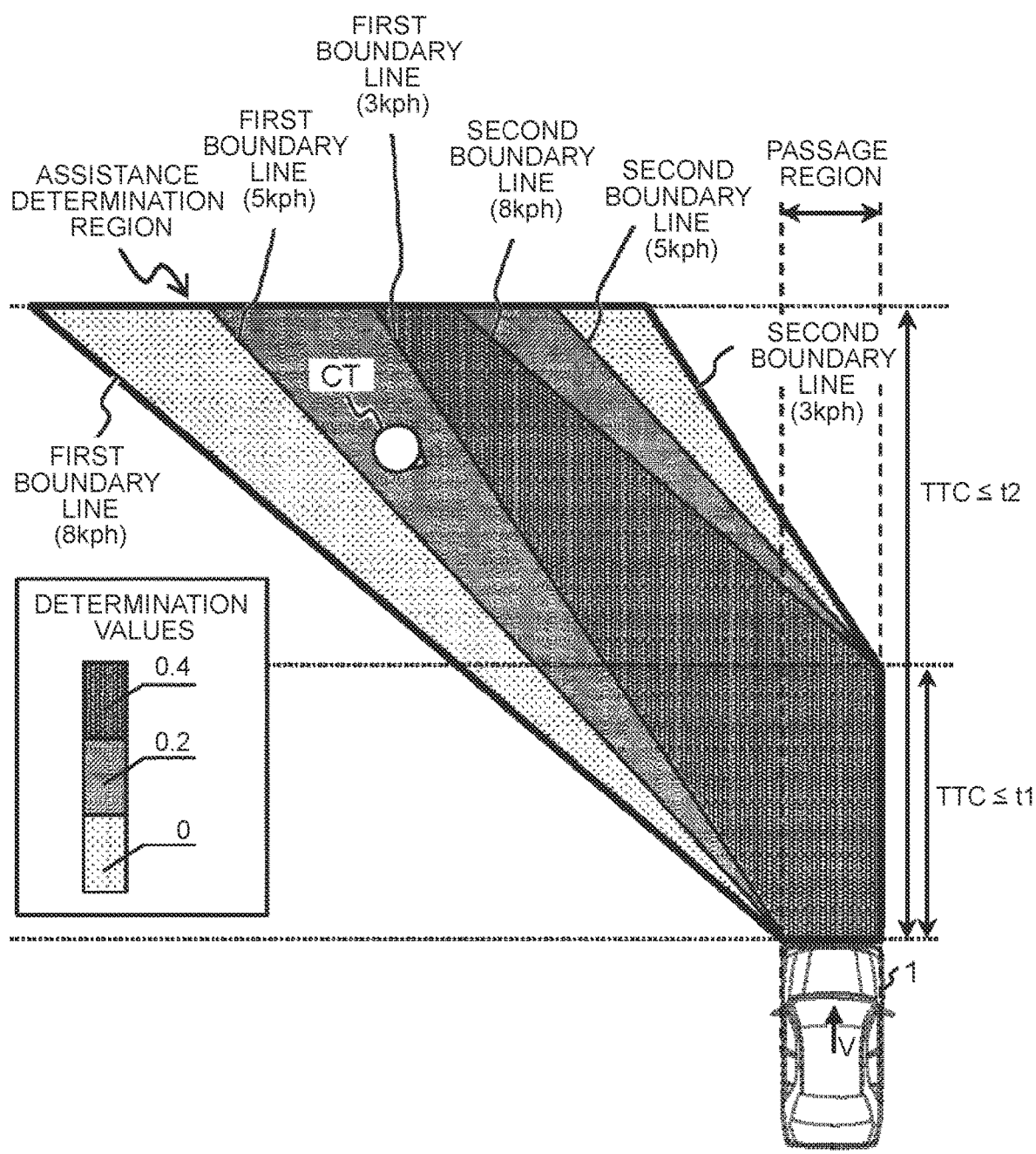
FIG. 5 is a conceptual diagram illustrating an example of an assistance determination region set by a control device according to an embodiment.

FIG. 5 is a conceptual diagram illustrating an example of an assistance determination region set by the control device 100 according to the present embodiment. In FIG. 5, three velocities of 3 kph, 5 kph, and 8 kph are set as the assumed lateral velocity of the object CT. The assistance determination region (the region surrounded by thick lines) is a combination of the caution regions set for each of the assumed lateral velocities that are set. Also, a determination value is given for each region sectioned by boundary lines. In FIG. 5, a determination value of 0.2 is given for the object CT. The control device 100 according to the present embodiment accumulates the determination values given in this way for each control cycle, and performs collision avoidance assistance control when the value exceeds a predetermined threshold value (e.g., exceeds 1).

By judging whether to perform collision avoidance assistance control in this way, collision avoidance assistance control is not performed immediately under the condition that the object CT is located in the caution region, and unnecessary operation of collision avoidance assistance control can be suppressed. Thus, annoyance of the passengers and occupants of the vehicle 1 can be reduced.

2. Configuration

Figure 6:
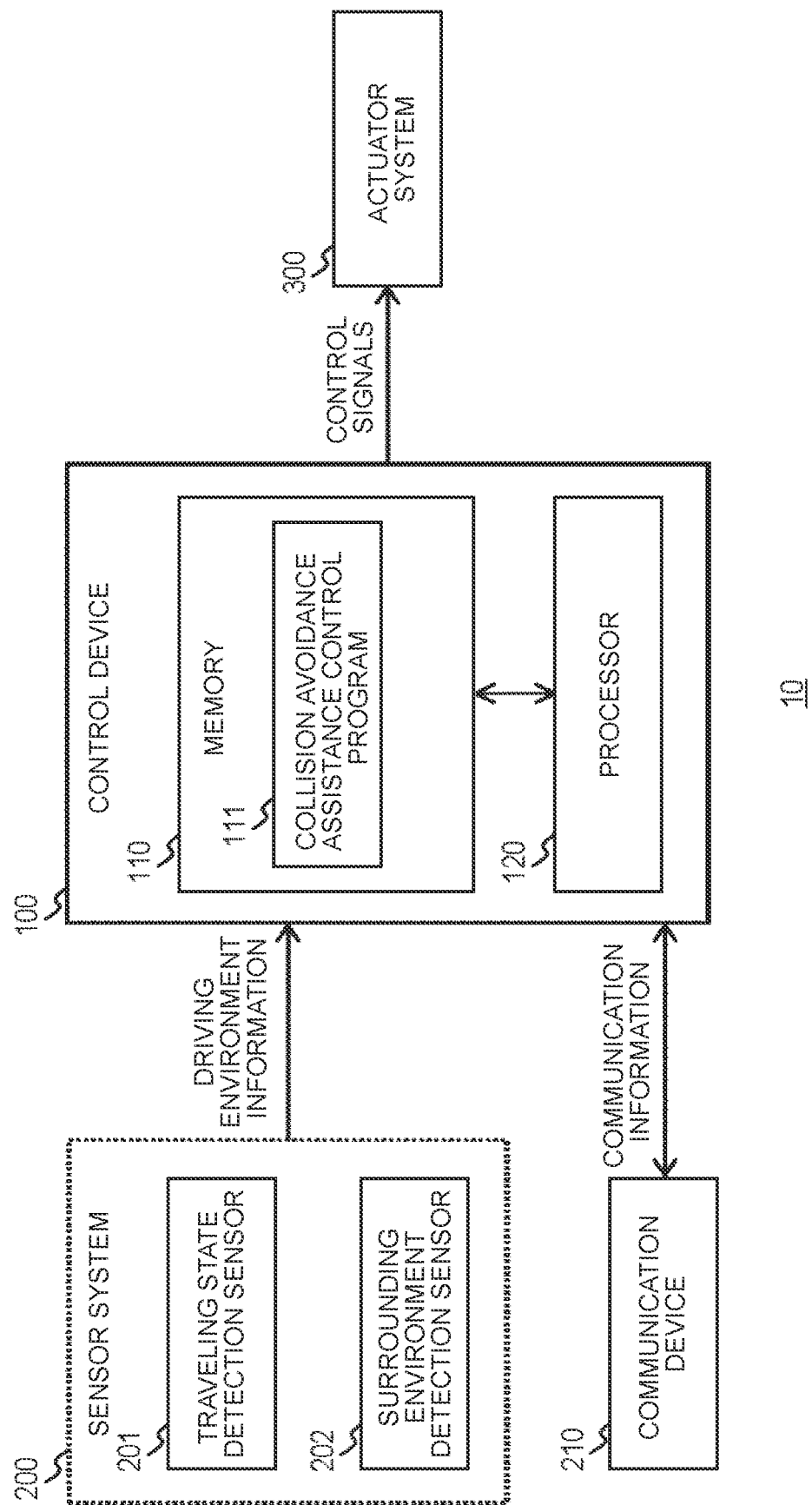
FIG. 6 is a block diagram illustrating a configuration of a vehicle system of a vehicle that is provided with the control device according to the embodiment.

FIG. 6 is a block diagram illustrating a configuration of a vehicle system 10 of the vehicle 1 provided with the control device 100 according to the present embodiment. The vehicle system 10 includes the control device 100, a sensor system 200, a communication device 210, and an actuator system 300. The control device 100 is electrically or wirelessly connected to the sensor system 200, the communication device 210, and the actuator system 300, and these are configured so as to be able to transmit information to each other.

The sensor system 200 is a sensor system that detects and outputs information representing a driving environment of the vehicle 1 (driving environment information). The sensor system 200 includes a traveling state detection sensor 201 and a surrounding environment detection sensor 202.

The traveling state detection sensor 201 detects and outputs a traveling state (vehicle speed, acceleration, yaw rate, and so forth) of the vehicle 1. The traveling state detection sensor 201 is, for example, a wheel speed sensor, an accelerometer, a gyroscope, or the like.

The surrounding environment detection sensor 202 detects information regarding the environment around the vehicle (lanes, obstructions, vehicles traveling ahead, and so forth). The surrounding environment detection sensor 202 is, for example, a millimeter wave radar, a camera, a light detection and ranging (LiDAR) device, or the like.

The sensor system 200 may include sensors that detect other driving environment information as well.

The communication device 210 exchanges various types of information (communication information) through communication with an external device from the vehicle. The communication device 210 is, for example, a device for performing vehicle-to-vehicle communication or road-to-vehicle communication, a device that provides a global positioning system (GPS) function, a device that exchanges communication information with a server connected to a communication network and configured on the network, and so forth. The communication information acquired by the control device 100 via the communication device 210 is, for example, map information, road traffic information, and so forth. The communication related to the communication device 210 may be performed in any form. For example, the communication may be performed by transmitting and receiving radio waves, or may be performed by exchanging information over a network.

The control device 100 executes various types of processing related to control of the vehicle 1 based on the acquired information, and generates control signals. The control device 100 then outputs the control signals to the actuator system 300, which will be described later. The control device 100 is typically an ECU installed in a vehicle. However, the control device 100 may be an external device that is not onboard the vehicle 1. In this case, the control device 100 acquires information and outputs control signals to the actuator system 300 via communication with the vehicle 1.

The control device 100 includes memory 110 and a processor 120. The memory 110 includes random access memory (RAM) that temporarily stores data, and read-only memory (ROM) that stores programs that are executable by the processor and various types of data related to the program. Information acquired by the control device 100 is stored in the memory 110. The processor 120 reads a program from the memory 110, and executes processing in accordance with the program, based on various types of data read from the memory 110.

The programs stored in the memory 110 include at least a program related to collision avoidance assistance control (collision avoidance assistance control program 111). The processor 120 executes processing according to the collision avoidance assistance control program 111 to generate control signals related to the collision avoidance assistance control of the vehicle 1. Details of the processing executed by the processor 120 in accordance with the collision avoidance assistance control program 111 will be described later.

Note that when the control device 100 executes other processing related to control of the vehicle 1, each processing may be provided as part of one program, or each processing may be provided by a separate program, and executed by separate processors. Alternatively, each processing may be executed by a separate ECU. In this case, the control device 100 may be composed of a plurality of ECUs. At this time, the ECUs are each configured to be able to mutually exchange information with each other to the extent that information necessary for executing the processing can be acquired.

The actuator system 300 is a system of actuators that operate in accordance with control signals that are provided by the control device 100. Examples of actuators included in the actuator system 300 include an actuator for driving an engine (an internal combustion engine, an electric motor, a hybrid thereof, or the like), an actuator for driving a braking mechanism provided in the vehicle 1, an actuator for driving a steering mechanism of the vehicle 1, and so forth. Operating the various types of actuators included in the actuator system 300 in accordance with control signals realizes various types of control of the vehicle 1.

3. Processing

Figure 7:
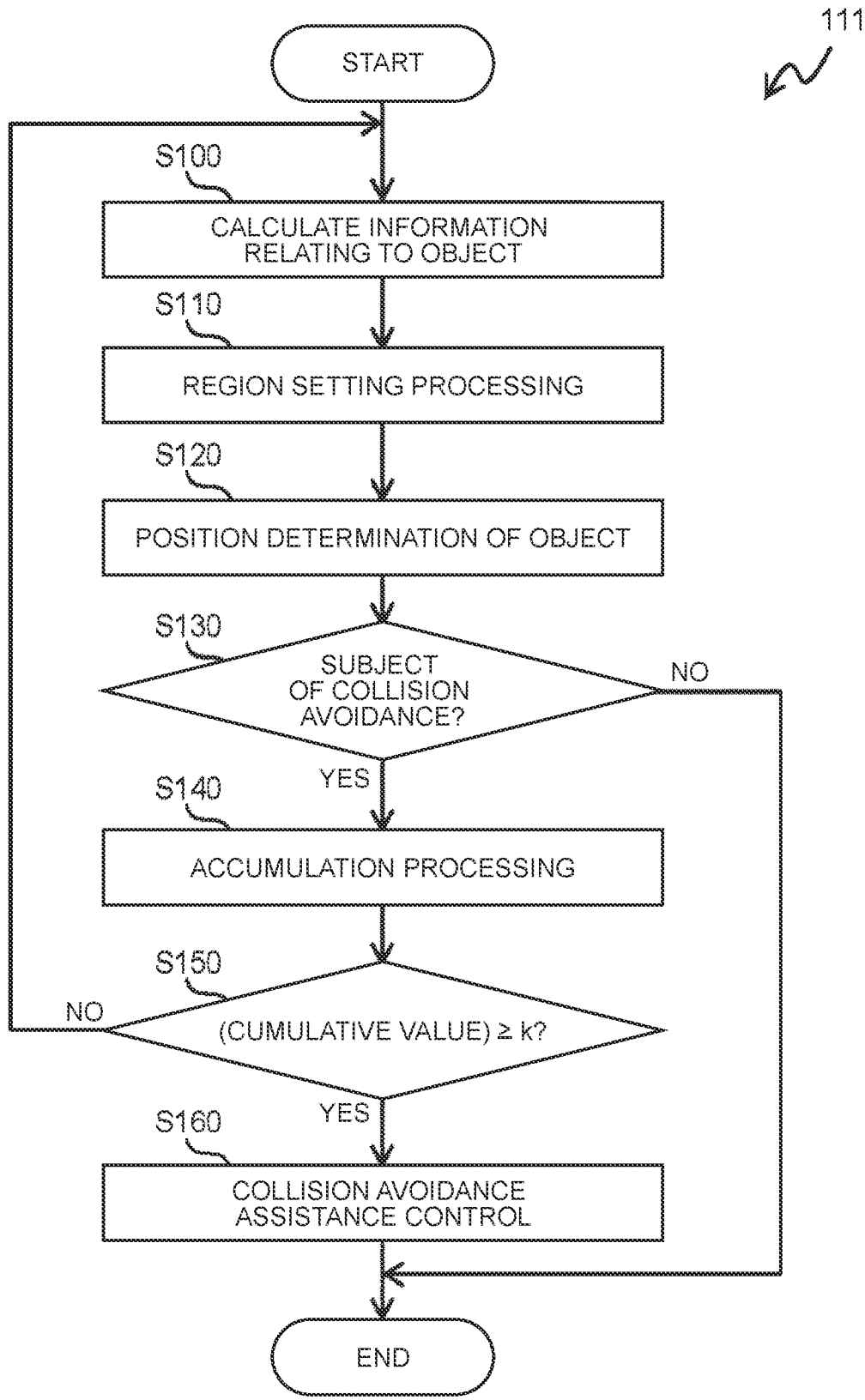
FIG. 7 is a flowchart showing processing executed by a processor in accordance with a collision avoidance assistance control program.

The processing executed by the processor 120 in accordance with the collision avoidance assistance control program 111 will be described below. FIG. 7 is a flowchart showing processing executed by the processor 120 in accordance with the collision avoidance assistance control program 111. The processing shown in FIG. 7 is starting when the surrounding environment detection sensor 202 detects an object CT (pedestrian, bicycle, stopped vehicle, obstruction, or the like) that could be a subject of collision avoidance forward of the vehicle 1, and the control device 100 acquires detection information of the object CT.

In step S100, the processor 120 calculates information related to the object CT, based on the acquired information. The information related to the object CT to be calculated includes at least the relative velocity and the TTC of the vehicle 1 and the object CT, the lateral position of the object CT, and the type of the object CT.

The relative velocity and the TTC of the vehicle 1 and the object CT can be calculated from, for example, the velocity of the vehicle 1, the distance between the vehicle 1 and the object CT, and the longitudinal velocity of the object CT. The lateral position of the object CT can be calculated from, for example, the distance between the vehicle 1 and the object CT. The type of object CT is typically included in the information detected by the surrounding environment detection sensor 202. The relative velocity and the TTC of the vehicle 1 and the object CT, and the lateral position of the object CT may be included in the information detected by the surrounding environment detection sensor 202.

Following step S100, the process advances to step S110.

In step S110 (region setting processing), the processor 120 sets an assistance determination region indicating a specific region forward of the vehicle 1. The assistance determination region is set as follows.

First, a plurality of assumed lateral velocities is set based on the type of the object CT. For example, in step S100, when assuming that the type of the object CT is a pedestrian, five assumed lateral velocities of 1 kph, 3 kph, 5 kph, 8 kph, and 10 kph are set. When assuming that the type of the object CT is a bicycle, five assumed lateral velocities of 10 kph, 12 kph, 15 kph, 18 kph, and 20 kph are set. In this way, the assumed lateral velocity set according to the type of the object CT as described above is a value given in advance to the collision avoidance assistance control program 111, or a value decided by a predetermined algorithm from the current detected lateral velocity of the object CT. These values or algorithms are optimally given through experimentation, by performing vehicle adaptation and so forth regarding the vehicle 1 provided with the vehicle system 10 according to the present embodiment. Hereinafter, the type of the object CT is to be assumed to be a pedestrian, and the five assumed lateral velocities of 1 kph, 3 kph, 5 kph, 8 kph, and 10 kph are set.

Next, for each of the set assumed lateral velocities, a caution region is set based on the relative velocity calculated in step S100, and a combination of each of the set caution regions is set as the assistance determination region. Each caution region set here is equivalent to the content described in FIG. 2. In this case, the magnitude of the inclination of the first boundary line and the second boundary line of the caution region are to be different for each of the set assumed lateral velocities. Further, the predetermined values t1 and t2 are values given in advance to the collision avoidance assistance control program 111, and are given optimally through experimentation. The TTC is based on the value calculated in step S100.

Figure 8:
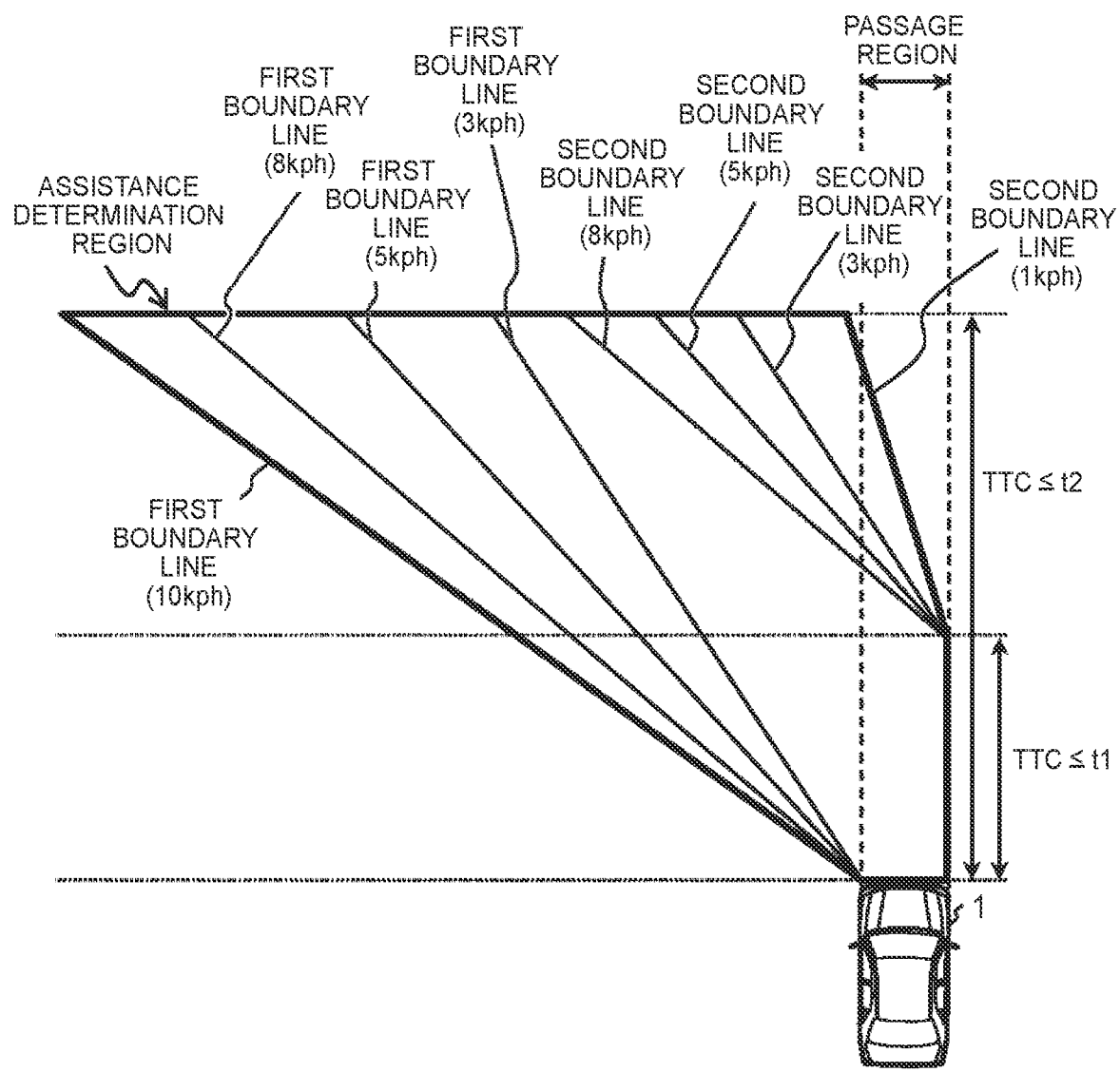
FIG. 8 is a conceptual diagram illustrating an example of an assistance determination region to be set in region setting processing shown in the flowchart in FIG. 7.

FIG. 8 illustrates an example of the assistance determination region set in step S110. In FIG. 8, the first boundary line of the caution region set for assumed lateral velocity of 1 kph and the second boundary line of the caution region set for assumed lateral velocity of 10 kph are omitted. As illustrated in FIG. 8, the assistance determination region (the region surrounded by thick lines) is a combination of the caution regions of 1 kph, 3 kph, 5 kph, 8 kph, and 10 kph, which are the set assumed lateral velocities.

Returning to FIG. 7, the processing advances to step S120 following step S110.

Figure 9:
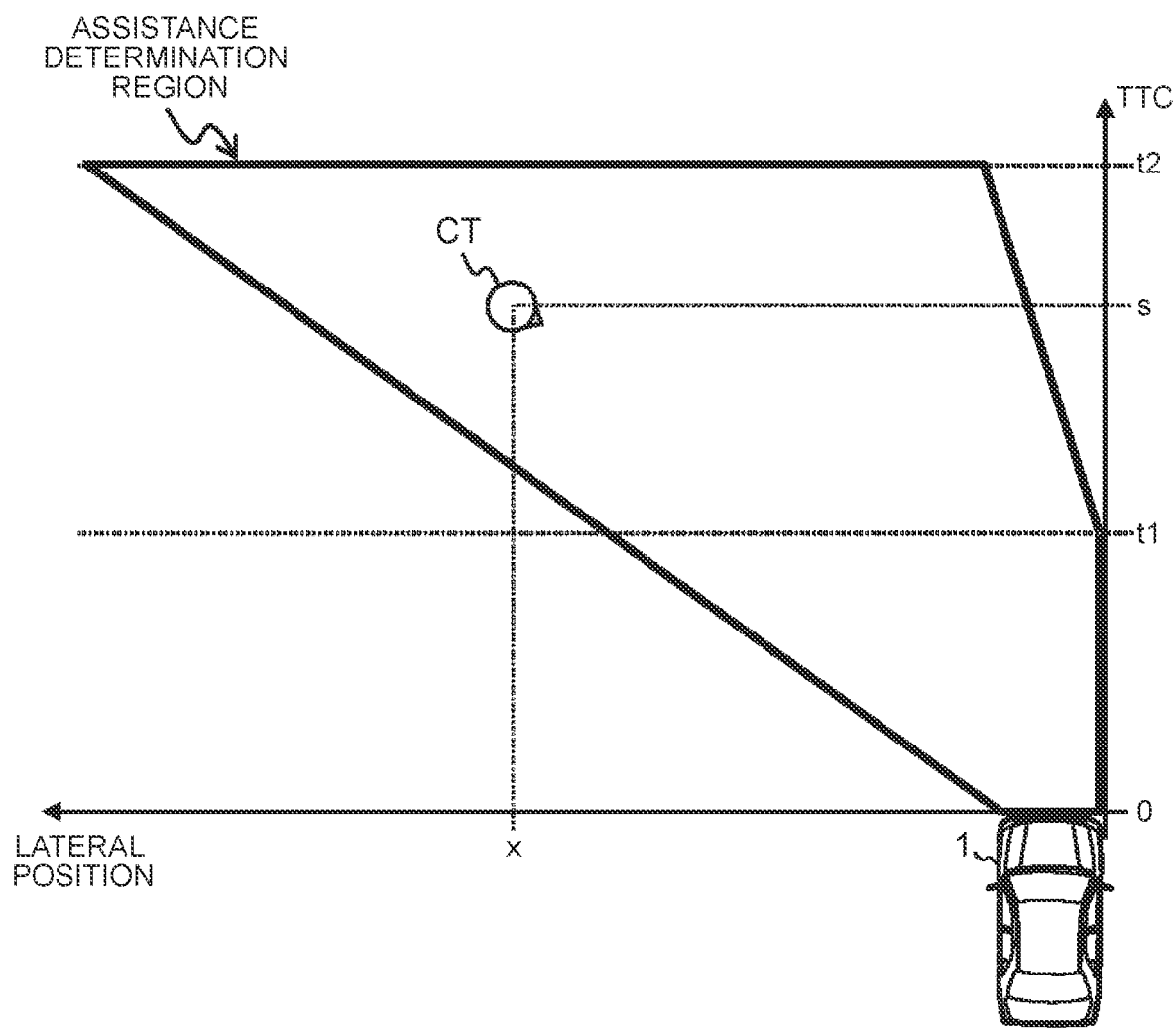
FIG. 9 is a conceptual diagram for describing position determination of the object, shown in the flowchart in FIG. 7.

In step S120, the processor 120 determines at which position the object CT is situated, in relation to the assistance determination region. The position of the object CT is determined based on the TTC and the lateral position calculated in step S100. FIG. 9 is a conceptual diagram for describing determination of the position of the object CT. The vertical axis in FIG. 9 represents the position in the direction of travel corresponding to the value of the TTC. The horizontal axis in FIG. 9 represents the lateral position.

The object CT is assumed to have a TTC of s (t1≤s≤t2) and a lateral position of x. At this time, the position of the object CT is determined, as illustrated in FIG. 9. However, determination of the position of the object CT may be based on other values. For example, determination may be made based on the distance between the vehicle 1 and the object CT that is detected by the surrounding environment detection sensor 202.

Returning to FIG. 7, the processing advances to step S130 following step S120.

In step S130, the processor 120 determines whether the object CT is a subject of collision avoidance. Here, when the object CT is located in the assistance determination region, determination is made that the object CT is the subject of collision avoidance. When the object CT is located in the assistance determination region (Yes in step S130), the processing advances to step S140. When the object CT is not located in the assistance determination region (No in step S130), the processing ends.

Note that even when the object CT is not the subject of collision avoidance and the processing ends, when the control device 100 acquires detection information related to the same object CT from the surrounding environment detection sensor 202, the process shown in FIG. 7 is to be started again for the same object CT.

Figure 10:
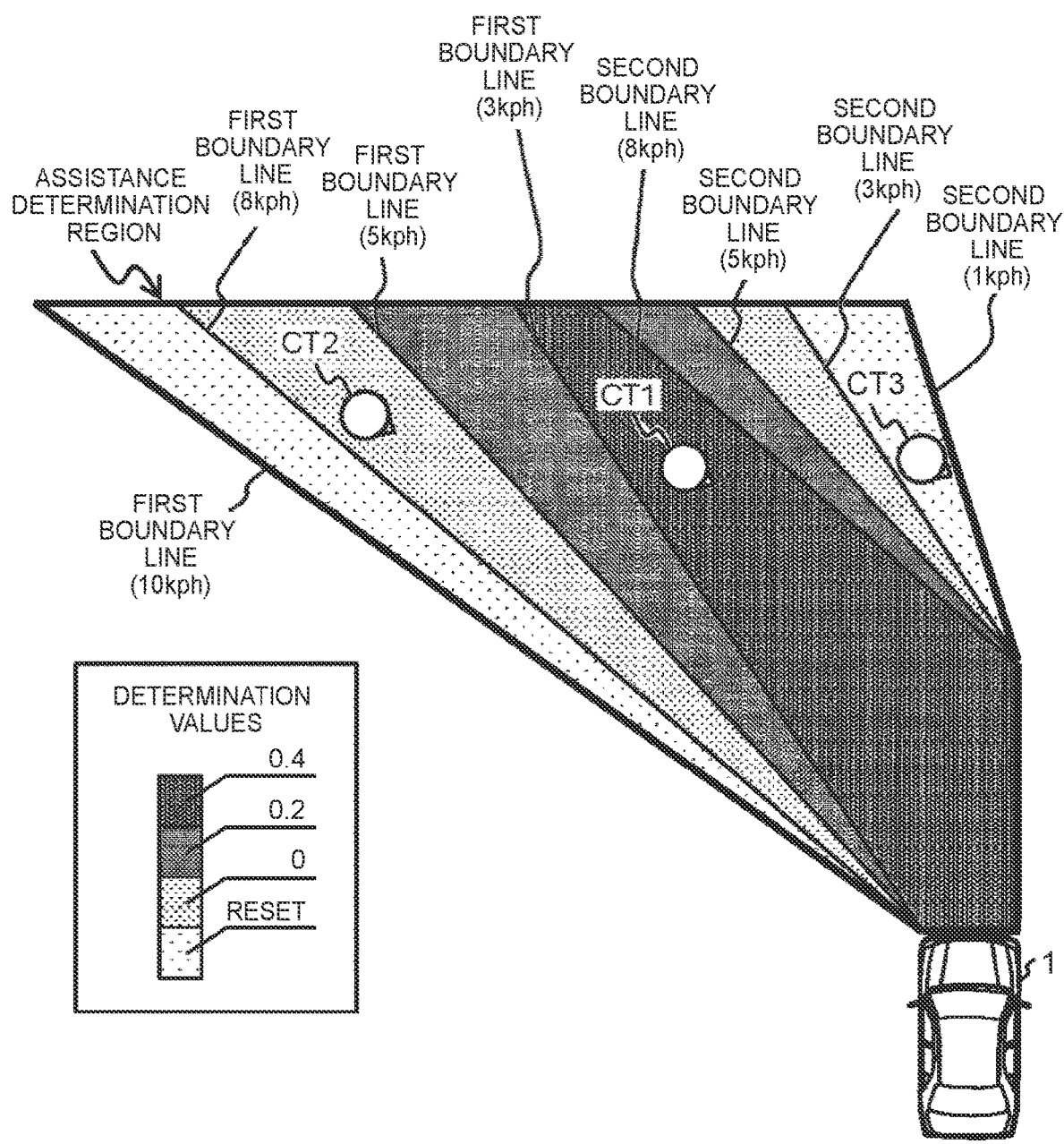
FIG. 10 is a conceptual diagram illustrating an example of determination values given according to the position of the object in the assistance determination region, in accumulation processing shown in the flowchart in FIG. 7.

In step S140 (accumulation processing), the processor 120 gives a determination value decided according to the position of the object CT that is the subject of collision avoidance, accumulates the values, and calculates a cumulative value. The cumulative value is stored until the processing regarding the object CT that is the subject ends. FIG. 10 illustrates an example of determination values given according to positions of objects CT. As illustrated in FIG. 10, the determination value is set for each region sectioned by boundary lines of each of the set caution regions. "Reset" here indicates setting the cumulative value to 0.

FIG. 10 illustrates three objects CT1, CT2, and CT3 for comparison. The object CT1 is located in a region of determination value 0.4, and the determination value 0.4 is accumulated in the cumulative value regarding the object CT1. The object CT2 is located in a region of determination value 0, and the cumulative value regarding the object CT2 is unchanged. The object CT3 is located in a region for determination value reset, and the cumulative value regarding the object CT3 is 0.

Returning to FIG. 7, the processing advances to step S150 following step S140.

In step S150, the processor 120 determines whether the cumulative value calculated in step S140 is no less than a predetermined threshold value k. The threshold value k is a value given in advance to the collision avoidance assistance control program 111, and is given optimally through experimentation. When the cumulative value reaches or exceeds the threshold value k (Yes in step S150), the processing advances to step S160. When the cumulative value is smaller than the threshold value k (No in step S150), the processing returns to step S100 and the processing is repeated.

In step S160, the processor 120 performs collision avoidance assistance control. The object that is the subject of collision avoidance assistance control is an object CT of which the cumulative value is determined to be no less than the threshold value k. The method of collision avoidance assistance control is not limited in particular. The method of collision avoidance assistance control may be braking control of the vehicle 1, or steering control of the vehicle 1. Alternatively, the vehicle 1 may be controlled by combining braking control and steering control based on the driving environment information.

The process ends after step S160.

4. Effects

As described above, the control device 100 according to the present embodiment sets an assistance determination region indicating a particular region forward of the vehicle 1, and accumulates determination values decided in accordance with the position of the object CT in the assistance determination region for each control cycle. When the cumulative value thereof exceeds the predetermined threshold value k, collision avoidance assistance control is performed. Thus, unnecessary operation of collision avoidance assistance control can be suppressed.

Figure 11:
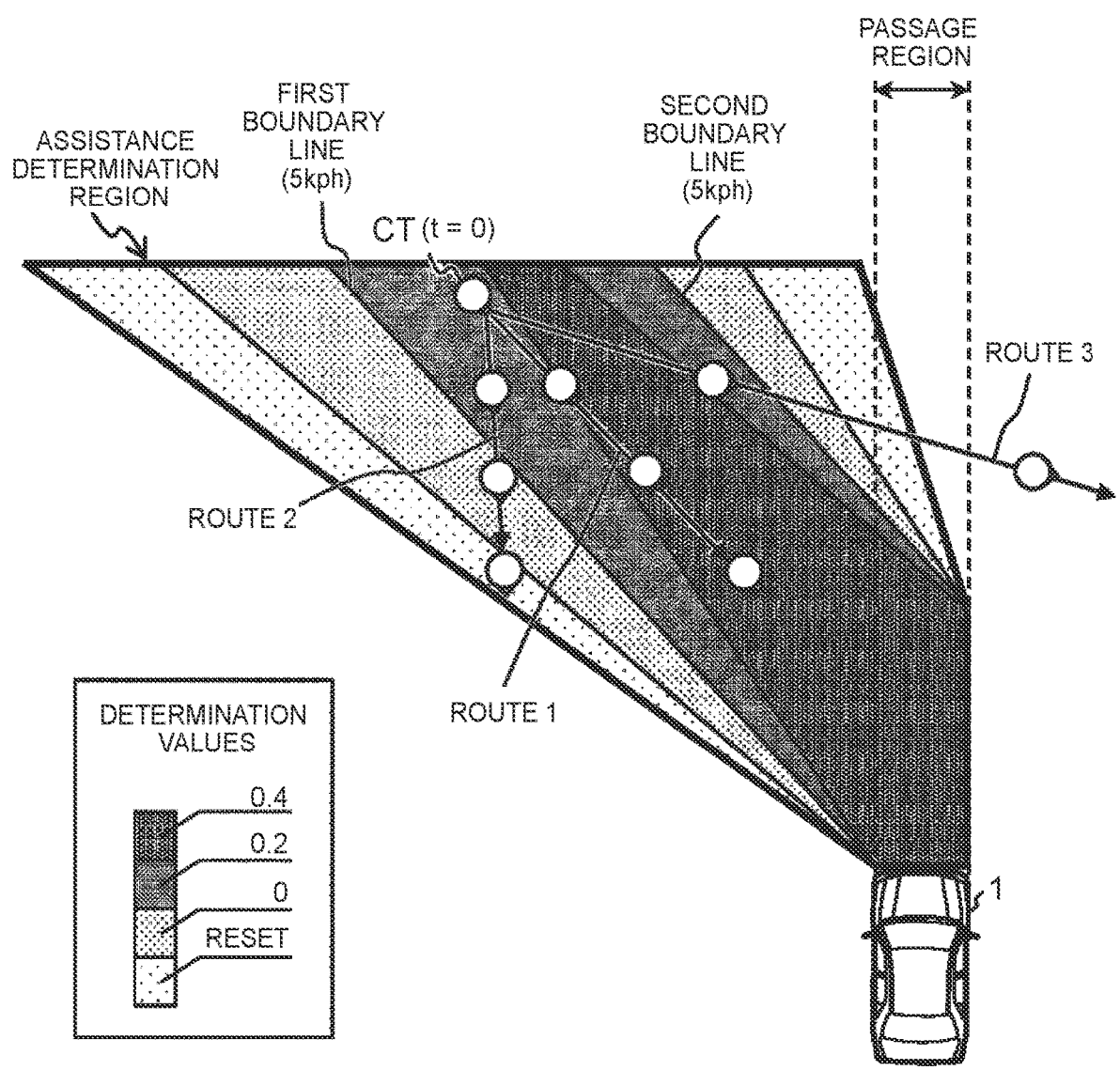
FIG. 11 is a conceptual diagram for describing effects of the control device according to the embodiment.

FIGS. 11 and 12 are a conceptual diagram and graphs for describing the effects of the control device 100 according to the present embodiment. The assistance determination regions and the determination values illustrated in FIG. 11 are the same as those illustrated in FIGS. 8 and 10. That is to say, the type of the object CT is assumed to be a pedestrian, and the five assumed lateral velocities of 1 kph, 3 kph, 5 kph, 8 kph, and 10 kph are set. In FIG. 11, three routes, which are route 1, route 2, and route 3 are illustrated as the movement routes of the object CT. On each movement route, the position of the object CT for each control cycle of the control device 100 is illustrated, with the position of t=0 as a starting point (the position at which the object CT is detected). FIG. 12 corresponds to FIG. 11, and shows cumulative values on each movement route. The control cycle of the control device 100 here is dt. Also, the value of the threshold value k is set to 1.

Route 1 represents an example in which the lateral velocity of the object CT is a general walking speed of 5 kph. In this case, as shown in FIG. 12, the cumulative value reaches or exceeds the threshold value k at time 3 dt, and collision avoidance assistance control is performed.

Route 2 represents an example in which the lateral velocity of the object CT is small, the TTC is no more than the predetermined value, and the object CT is not to be located in the passage region of the vehicle 1. In this case, the cumulative value is not to reach or exceed the threshold value k, as shown in FIG. 12, and collision avoidance assistance control is not performed.

Route 3 represents an example in which the lateral velocity of the object CT is great, and quickly passes through the passage region of the vehicle 1. In this case, the cumulative value is not to reach or exceed the threshold value k, as shown in FIG. 12, and collision avoidance assistance control is not performed. Further, in the example shown in FIG. 12, the object CT is located outside the assistance determination region at time 2 dt, and the object CT is not the subject of collision avoidance.

In this way, operation of collision avoidance assistance control can be suppressed when the velocity of the object CT is great or small in comparison to the predicted velocity, and collision avoidance assistance is unnecessary. Thus, annoyance of the passengers and occupants of the vehicle 1 can be reduced.

Also, appropriately deciding the predetermined values t1 and t2, the determination values, the threshold value k, and so forth, enables collision avoidance assistance control to be suppressed from operating with regard to objects CT outside of the roadway region, and accordingly, collision avoidance assistance control does not have to be restricted to roadway regions. Further, unnecessary operation of collision avoidance assistance control due to erroneous recognition related to objects CT (determination of whether located in the roadway region, determination of whether attempting to cross the roadway region, and so forth) can be suppressed.

What is claimed is:

1. A control device for collision avoidance assistance, the control device comprising a processor configured to:
   execute region setting processing for setting an assistance determination region indicating a particular region forward of a vehicle;
   execute accumulation processing in which the processor gives an object a determination value and accumulates the determination value, the object being located in the assistance determination region, the determination value being decided according to a position of the object; and
   perform collision avoidance assistance control of assisting in avoidance of collision of the vehicle and the object based on driving environment information representing a driving environment of the vehicle, when a cumulative value regarding the object calculated in the accumulation processing exceeds a predetermined threshold value, wherein:

the processor is configured to, in the region setting processing,
- set a plurality of assumed lateral velocities, the plurality of assumed lateral velocities being assumed values of a velocity of the object in a direction perpendicular to a direction of travel of the vehicle, and
- set a caution region for each of the plurality of assumed lateral velocities, the caution region being a region in which the object is located in a passage region of the vehicle with a collision leeway time of no more than a predetermined value, the assistance determination region is a combined region of each of the caution regions;

in the accumulation processing, the determination value is a value decided for each region sectioned by boundary lines of each of the caution regions; and magnitudes of an inclination of a first boundary line and a second boundary line of the caution region are different for each of the plurality of assumed lateral velocities, and are represented by a ratio of a relative velocity between the velocity of the vehicle and the velocity in any direction of the object to the lateral velocity of the object.

2. The control device according to claim 1, wherein the processor is configured to:
- acquire information regarding a type of the object; and
- in the region setting processing, set each of the plurality of assumed lateral velocities based on the type of the object.

3. The control device according to claim 1, wherein the caution region is a roadway region.

4. The control device according to claim 1, wherein the caution region is a region in which a first time-to-collision is a first predetermined value or less, and the object is situated in a passage region of the vehicle with a second time-to-collision of a second predetermined value or less.

5. A collision avoidance assistance method comprising:
- region setting processing for setting an assistance determination region indicating a particular region forward of a vehicle;
- accumulation processing in which an object located in the assistance determination region is given a determination value decided according to a position of the object, and the determination value is accumulated; and
- performing assistance for avoidance of collision with the object, when a cumulative value regarding the object calculated in the accumulation processing exceeds a predetermined threshold value, wherein:

the region setting processing includes
- setting a plurality of assumed lateral velocities, the plurality of assumed lateral velocities being assumed values of a velocity of the object in a direction perpendicular to a direction of travel of the vehicle, and
- setting a caution region for each of the plurality of assumed lateral velocities, the caution region being a region in which the object is located in a passage region of the vehicle with a collision leeway time of no more than a predetermined value;

the assistance determination region is a combined region of each of the caution regions;

the determination value is a value decided for each region sectioned by boundary lines of each of the caution regions; and magnitudes of an inclination of a first boundary line and a second boundary line of the caution region are different for each of the plurality of assumed lateral velocities, and are represented by a ratio of a relative velocity between the velocity of the vehicle and the velocity in any direction of the object to the lateral velocity of the object.

6. The collision avoidance assistance method according to claim 5, wherein in the region setting processing, each of the plurality of assumed lateral velocities is set based on a type of the object.

7. The collision avoidance assistance method according to claim 5, wherein the caution region is a roadway region.

8. The collision avoidance assistance method according to claim 5, wherein the caution region is a region in which a first time-to-collision is a first predetermined value or less, and the object is situated in a passage region of the vehicle with a second time-to-collision of a second predetermined value or less.

\* \* \* \* \*